3,573,174
PROCESS FOR THE DETECTION OR DETERMINATION OF FLUORINE
Paul Caro, Tempe, Ariz., assignor to Etat Francais, represente par le Ministredes Armees, Delegation Ministerielle pour l'Armenent (Direction des Poudres), Paris, France
Filed Oct. 22, 1965, Ser. No. 502,639
Claims priority, application France, Oct. 23, 1964, 992,386
Int. Cl. B01k 1/00
U.S. Cl. 204—1             5 Claims

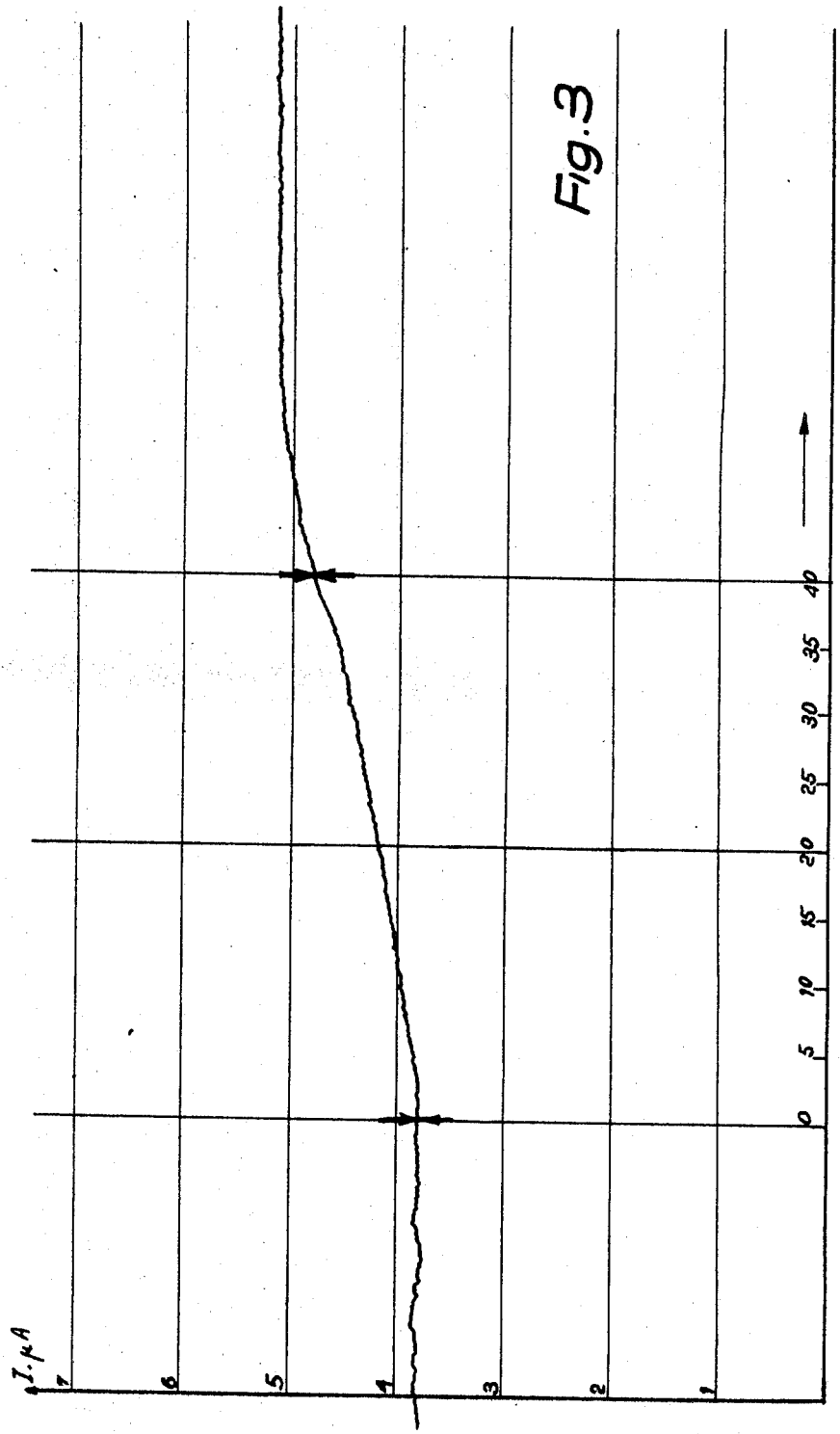

ABSTRACT OF THE DISCLOSURE

Fluorine is detected or determined by introducing a sample being analyzed for the presence of fluorine into an acid solution having immersed therein a zirconium electrode and a platinum electrode and measuring the electric current which is produced.

---

It is known to detect fluorine and, if required, compositions containing fluorine in solutions, by means of an apparatus having a rotary electrode constituted by an aluminium wire and a platinum wire, the two electrodes being immersed in an acetic acid solution containing the fluorine or the fluorine compounds. For the same purpose, an apparatus has already been used which is constituted by a fixed aluminium electrode and a platinum wire likewise immersed in an acetic acid solution.

However, this known technique has certain serious disadvantages; in particular, the rotary aluminium electrode is used only for the analysis of aqueous solutions containing fluoride ions and cannot be employed for the analysis of gases because of its sensitivity to oxygen.

In contrast, the fixed aluminium electrode allows the determination and analysis of fluorine in gases, but necessitates constant renewal of the reagent due to rapid consumption of fluorine due to the presence of the fixed electrode. This leads to a reduction in the sensitivity for low concentrations due to the impossibility of accumulating fluorine in the measuring cell. Also devices using fixed aluminium electrodes are only slightly sensitive because of the high level of the residual current.

Moreover, they require the use of a solution of a relatively precise pH, in particular normal acetic acid solutions having a pH between 2 and 3. This leads to the impossibility of dissociating certain organic fluorine compounds, which require a very acid pH in order to become dissociated. If the pH is reduced in such devices, the fixed aluminium electrode will give an unstable current affected by strong periodic disturbances which upset all measurements.

Another disadvantage of such devices having a fixed aluminium electrode stems from the necessity of conserving the electrodes permanently in the bath.

Repeated manipulations and changes of solution thus lead to rapid corrosion.

The present invention concerns a process for detection and/or determination of fluorine which overcomes the various disadvantages mentioned above.

According to the process of the invention, the detection and/or determination of fluorine and of compounds containing fluorine, in solution or in gases such as air, is effected by means of an electric current produced by a system of two electrodes, one constituted by a wire or plate of platinum and the other by zirconium, the two electrodes being immersed in a solution of a strong oxidizing acid.

According to one preferred feature of the invention, the zirconium electrode is constituted by a wire rotating at a speed between 300 and 1600 r.p.m.

According to another feature, the acid solution in which the electrodes are immersed is a nitric acid solution having a concentration between 1 N and 5 N.

According to a still further characteristic of the invention, the zirconium electrode is held at a potential between $-1$ and $+1$ volt with respect to a saturated calomel electrode.

According to the invention, the liquid to be analysed, produced either by dissolving a solid material or by bubbling air or a gas to be analysed into a liquid, is introduced into a cell of glass or a plastic material into which the two electrodes project. The current which is produced between the two electrodes is then measured, or the increase over the previously existing current which occurs, either by means of a micro-ammeter or by means of a millivoltmeter connected to the terminals of a resistance in which flows the current produced by the two-electrode system.

In the apparatus according to the invention, comprising the two electrodes mentioned immersed in a nitric acid solution, a very small and constant flow of current takes place in the absence of fluoride ions. This current is called the residual current. When fluoride ions are present in the solution, the zirconium is attacked and this phenomenon causes the passage of an electric current having an intensity which is proportional to the quantity of fluoride ions present. This current is only characteristic of fluoride ions of the order of $10^{-4}$ moles per litre.

It is thus necessary, in order to be able to make the measurements under the best conditions, previously to introduce into the solution a predetermined quantity of fluoride ions, ranging for example from $10^{-4}$ to $10^{-3}$ moles per litre. The electrodes thus produce a stable and fixed current called the limiting current. If fluorine is then introduced into the measuring cell, the limiting current increases and a new value proportional to the quantity of ions introduced is established.

Thus the addition to the acid solution of a liquid containing fluorine and/or fluorine compounds or by bubbling in air or other gas containing fluorine and/or fluorine compounds causes an increase in the current which is proportional to the quantity of fluoride ions contained in the material added. It is thus possible, according to the process of the invention, to measure an increase in the concentration of fluoride ions of 0.05 µg. per cm.$^3$ in the liquid contained in the electrolysis cell.

According to another characteristic of the process of the invention, a predetermined quantity of fluoride ions, corresponding to a concentration between $10^{-4}$ and $10^{-3}$ moles per litre, is previously introduced into the solution in which the two electrodes are immersed in order to obtain a fixed stable current. The quantities of fluorine and/or fluorine compounds contained in the liquids or gases to be analysed increases in a manner proportional to the limiting current and can thus be measured for increases of concentration of 0.05 µg. per cm.$^3$ in the liquid contained in the electrolysis cell.

According to the process of the invention, very small quantities of fluorine can be analysed. In fact, by bubbling through a known volume of air or gas, an increase in the fluorine in the cell is caused and the detection threshold can then be achieved. Such a result cannot be obtained with systems in which the reactant must be constantly renewed.

For a cell containing 25 cm.$^3$ liquid and by providing an air stream of 10 litres per minute, it is possible in 5 minutes to detect the presence of fluorine in the gas at a content of 25 µg. per m.$^3$. Therefore it is possible to detect lower concentrations by carrying out the bubbling for a longer time.

By way of illustration only, a non-limiting example of an apparatus which allows the process of the invention to be carried out is described below in conjunction with the accompanying drawings, in which:

FIG. 3 shows a typical graphical record of current plotted as a function of time.

Figure 1:
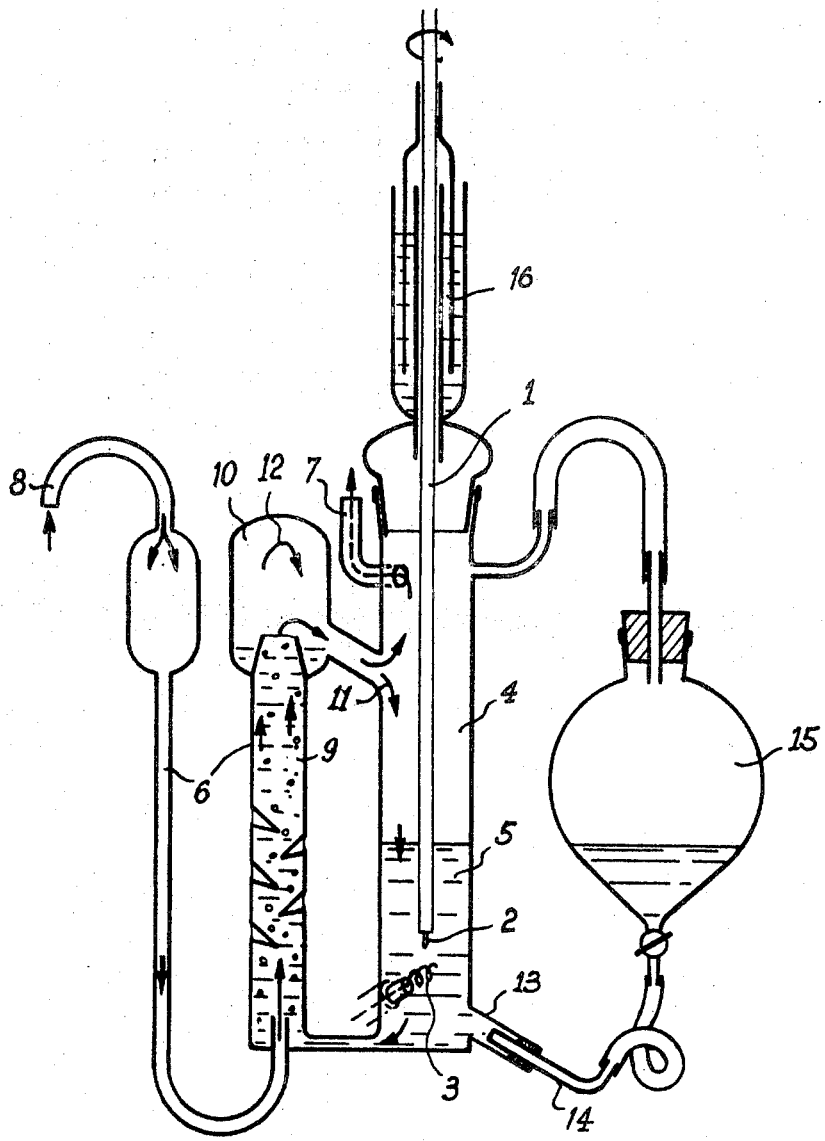
FIG. 1 shows such an apparatus in diagrammatic form.

It can be seen from FIG. 1 that a rotary electrode 1 is constituted by a zirconium wire surrounded by glass or a plastic material.

The length of the part 2 of this wire 1 which is not protected and which is immersed in the solution can range from 1 to 10 mm.

A mercury contact or a sliding contact allows connection to be made between this electrode 1 and a measuring system. The speed of rotation of the electrode 1 ranges from 300 to 1500 r.p.m.

The electric current produced in the apparatus for a predetermined concentration of fluoride is proportional to the length of the wire 2 immersed in the acid solution.

The rotary electrode can be replaced in other apparatus by a zirconium plate which is fixed or connected to a system which allows it to vibrate.

The apparatus also includes an electrode 3 constituted by a platinum wire.

In other apparatus, this platinum electrode can be constituted by a plate.

The two electrodes 1 and 3 are disposed in a cell 4 of glass or plastic material in which is located a liquid 5 in which the two electrodes are immersed. This cell can contain for example 10 to 50 cm.$^3$ of liquid.

This cell 4 is provided with a gas introduction system 6 for analysis of fluorine levels which can range up to 10 litres per minute or more. Introduction of the gas is effected at an aspirator 7 connected for instance to a pump.

The gas to be analysed enters at 8 into the introduction system and bubbles into a column 9, separating from the liquid at the top of this column. The liquid/gas separation takes place in a reservoir 10 disposed above the column 9. The liquid returns to the body of liquid 5 in which the two electrodes are immersed.

Circulation of the liquid is indicated by the fine arrows such as 11 and circulation of the gas is indicated by the thick arrows such as 12.

The cell 4 is also provided with a lateral tube 13 to which is connected a capillary tube 14 connected to a container 15 containing a solution of a low concentration of fluoride ions (for example $1.7 \times 10^{-4}$ M for a solution of $3 \times 10^{-4}$ in the cell at 5).

This allows control of the constancy of the liquid level in the cell and compensates for the reduction in the concentration of fluoride ions in the cell due to consumption by the electrode. A current which is rigorously constant with time is thus obtained.

The cell 4 can also be connected to a lateral tube provided with a fritted glass disc and an agar-agar bridge saturated with potassium chloride or potassium nitrate and connected to a saturated calomel electrode.

The connection between the rotary electrode 1 and the cell is made by means of a rotary mercury seal 16. It can also be made by means of a sliding joint constituted by a plastic material for example.

The two electrodes 1 and 3 are short-circuited, either through a micro-ammeter which allows direct measurement of the current or through a resistance, at the terminals of which the potential is measured by means of a millivoltmeter.

An electric device can also allow a variable potential to be applied between the zirconium electrode and a saturated calomel electrode, measurement of the current being effected always between the zirconium electrode and the platinum electrode.

In the case where the apparatus is used for simple analysis of fluoride in solution in an amount above $10^4$ mole per litre, the solution to be analysed can be used directly, by adding to it nitric aci and graphically comparing the current obtained with a scale current previously established with the same electrode and the same concentration of nitric acid.

Figure 2:
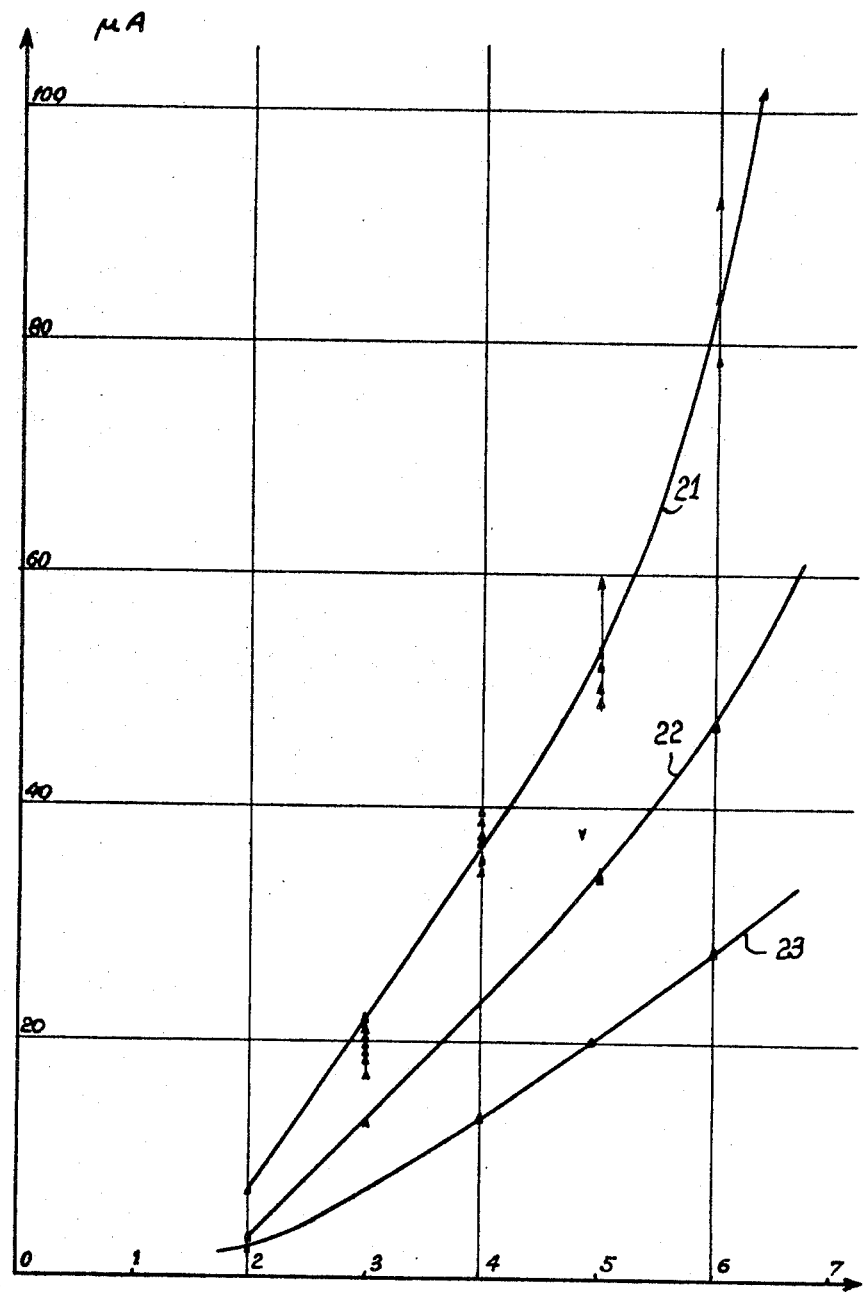
FIG. 2 shows the calibration curves obtained with certain concentrations of a fluoride.

FIG. 2 shows an example of such a graph. In this graph, curves are shown which represent the limiting current in micro-amperes as a function of the concentration of sodium fluoride in $10^{-4}$ M.

The curve 21 corresponds to a free length of electrode (part 2 of electrode 1) of 10 mm.

The curve 22 corresponds to a free length of 5 mm.

The curve 23 corresponds to a free length of 3.5 mm.

The nitric acid solution has a concentration of 2 N and the rotary electrode 1 rotates at a speed of rotation of 1100 r.p.m.

By means of such curves, the increase in concentration of fluoride ions can also be measured, which is caused by the introduction of a liquid sample or a previously dissolved solid sample or by a soluble solid soluble directly in solution, or the increase in concentration caused by bubbling in a known volume of gas.

The curve can also be established when the zirconium electrode is subjected to a potential with respect to a saturated calomel electrode. These potentials can range between $-1$ and $+1$ volt, preferably from $-0.65$ to $-0.25$ volt.

It is also possible to record the current produced between the zirconium electrode and the platinum electrode when the potential between the zirconium electrode and the calomel electrode varies at constant speed, between 0 and 200 mv./minute, preferably in the order of from positive potential to negative potential or in the reverse order. It will be observed that, in the range of potential between $-0.25$ and $-0.65$ volt, there is a maximum intensity of current which is proportional to the fluoride content in the solution. This maximum value is used to establish the basic curve.

It is preferable to utilise a rotary zirconium electrode rather than a fixed or vibrating plate because stability of the current is better and because of the better reproducability of one series of tests to another.

Before first using the electrodes, it is advisable to short-circuit them by immersion for several minutes in a concentrated solution of fluoride ions, for example $10^{-2}$ M of sodium fluoride. Intense introduction of air or even of gas (0 to 10 litres/minute) does not modify the limiting current value and does not upset its constancy.

In the case where it is necessary to measure very small quantities of fluoride ions, it is preferable to operate under the following conditions, given by way of example:

A rotary electrode is used (for example, 3 to 4 mm. long) in a low concentration solution of fluoride ions (for example 2 to $3 \times 10^{-4}$ M/litre 2 N $HNO_3$). A limiting current is obtained having a value between 5 and 10 $\mu A$ which allows the use of maximum sensitivities in the recording instrument. An increase in currents of the order of 0.1 to 0.2 $\mu A$. is thus readily recorded. In general, the limiting current is stable in a range below 0.1 $\mu A$. It can undergo a slight change, in the sense of a diminution of the current, at the end of a very long time (after at least some hours).

There are given below, by way of example, illustrative examples of the detection and analysis according to the process of the invention.

EXAMPLE 1

Rotary zirconium electrode, free length (extremity 2 in FIG. 1): 3.5 mm.

Speed: 1100 r.p.m.

No potential was applied to the zirconium electrode.

The solution (25 cm.³) contained:
Sodium fluoride in a concentration of
2×10⁻⁴ M
2 N HNO₃.

Analysis was carried out of a gas containing 85 μg./m.³ of hydrofluoric acid.

The stable residual current, before the connection to the atmosphere containing hydrofluoric acid, was 3.8 μa. with air bubbling at 8 l./minute. When the aspiration was connected to atmosphere for analysis for about 40 minutes, the current passed from 3.8 μa. to 5.15 μa., the deviation being apparent after 5 minutes.

FIG. 3 shows the curve obtained representing the intensity of the current in μa. as a function of the time in minutes. The starting point for the time is taken as the moment when HF is added to the air bubble through. Before this starting point, the apparatus operates in a stationary manner for several hours.

Altogether 320 litres of gas were introduced at 85×10⁻³ μg./litres, which corresponds to a total of 27 μg. of fluoride ions. As the cell contains 25 cm.³, a little more than approximately 1 μg./cm.³ of fluoride ions is provided, which gives an increase in current of 1.35 μa. per 1 μg./cm.³. The presence of this concentration of hydrofluoric acid is detectable after 5 minutes and is certain once the current exceeds the residual current of 0.2 μa., namely after 10 minutes. The apparatus can thus operate as a detector at the same time as an apparatus for quantitative measurement.

EXAMPLE 2

The curves of FIG. 2 show how it is possible to measure fluoride ions in solution by means of a previously-prepared comparison curve.

EXAMPLE 3

Rotary zirconium electrode, free length (extremity): 3.5 mm.
Speed: 1100 r.p.m.

The solution (25 cm.³) contained
NaF at a concentration of 3×10⁻⁴ M
2 N HNO₃.

For a test of long duration, the 300 cc. container contained:

NaF: 1.8×10⁻⁴ M
2 N HNO₃.

Air introduction took place at a rate of 8 l./minute.
The current was stable for 68 hours at 3.4 μa. (±0.04 μa.).

An atmosphere containing 210 μg./m.³ of fluorine-containing gas was analysed (fluoroalkyl phosphanate).

After connection to this atmosphere, the increase in current was detected after 7 minutes. The test lasted for 15 minutes and the current increased to 0.3 μa.

The equivalent atmosphere of hydrofluoric acid was 30 μg./m.³ after 7 minutes.

Also to demonstrate the difference between the use of the rotary zirconium electrode in accordance with the process of the invention and a rotary aluminium electrode, the effect of oxygen on the two electrodes of this kind has been compared.

The two electrodes under identical conditions are located in a solution containing 10⁻⁴ M fluoride ions and the value of the potential at zero current was admixed with respect to a saturated calomel electrode.

The following table gives the results obtained, it being noted that for the aluminium electrode the nature of the electrolyte was varied. A concentrated nitric acid medium was not used because, as mentioned above, in such a medium the potential of the aluminium electrode is unstable.

TABLE

| Nature of the electrode | Nature of the electrolyte | pH | −E (nitrogen) | −E (O₂) | E(V) |
|---|---|---|---|---|---|
| Aluminium | HClO₄ (0.1 M) | 1.1 | 1.295 | 1.081 | 0.214 |
| Aluminum | Acetic acid (0.01 M) plus sodium acetate (0.01 M) | 3.8 | 1.387 | 0.822 | 0.565 |
| Aluminum | Acetic acid (0.05 M) plus sodium acetate (0.05 M) | 4.6 | 1.405 | 0.891 | 0.515 |
| Zirconium | HNO₃ | 1.0 | 0.865 | 0.850 | 0.014 |

I claim:

1. A process for the detection or determination of fluorine, comprising introducing a sample being analyzed for the presence of fluorine into a solution of a strong oxidizing acid having immersed therein a zirconium electrode and a platinum electrode and measuring the electric current which is produced.

2. Process according to claim 1, in which the zirconium electrode is constituted by a wire arranged to rotate at a speed from 300 to 1500 r.p.m.

3. Process according to claim 1, in which the acid solution in which the electrodes are immersed is a nitric acid solution having a concentration from 1 N to 5 N.

4. A process according to claim 1, in which the zirconium electrode is held at a potential from −1 to +1 volt with respect to a saturated calomel electrode.

5. A process according to claim 1, in which there is previously introduced into the solution in which the two electrodes are immersed a predetermined quantity of fluoride ions corresponding to a concentration of 10⁻⁴ to 10⁻³ mole/litre.

References Cited

UNITED STATES PATENTS 2,870,067  1/1959  Baker et al. _____ 204—1.1

REUBEN EPSTEIN, Primary Examiner

U.S. Cl. X.R.
204—195